Figure 1:
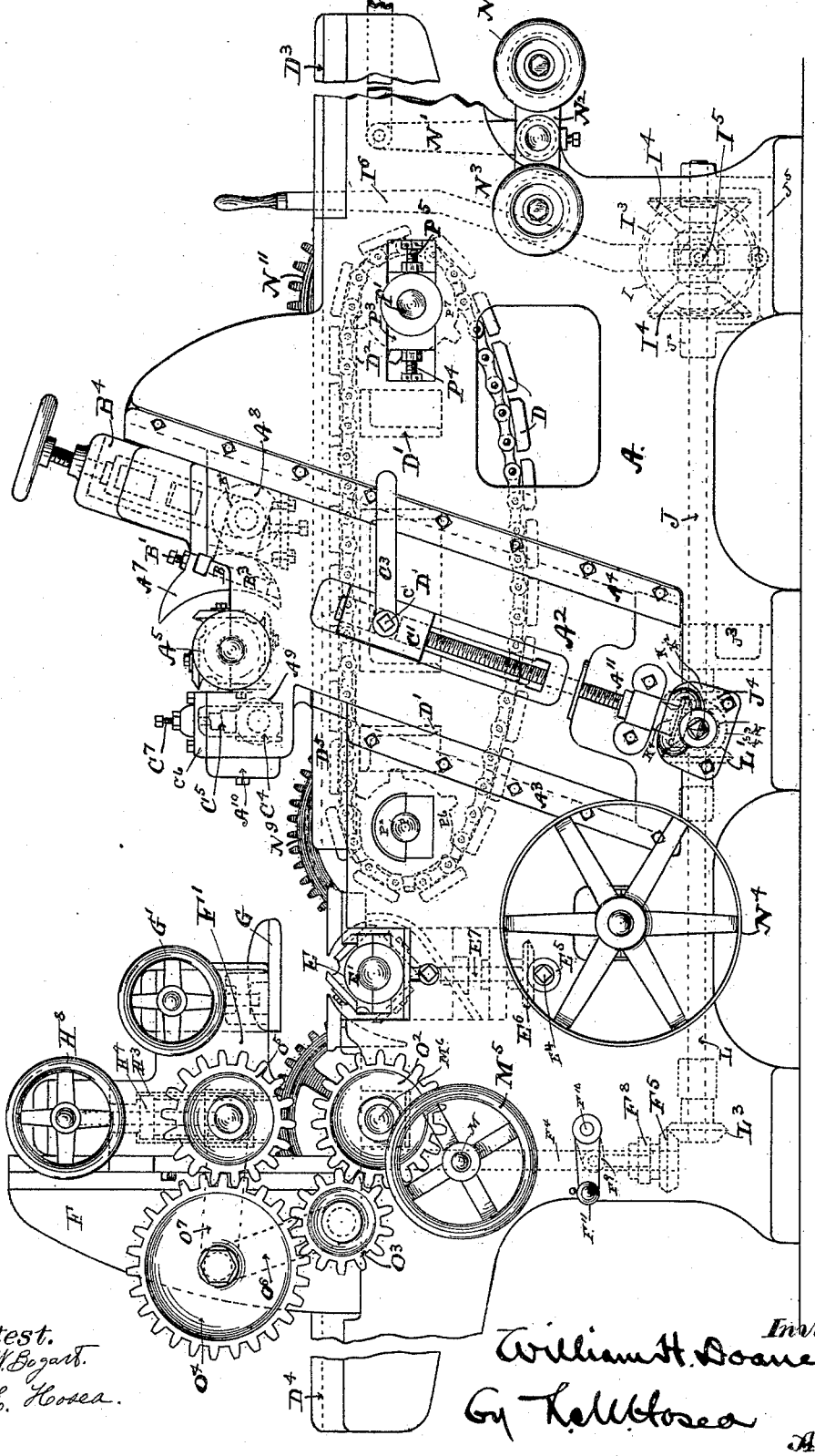

(No Model.) 5 Sheets—Sheet 2.
W. H. DOANE.
ENDLESS BED SURFACE PLANING MACHINE.

No. 417,238. Patented Dec. 17, 1889.

Attest.
C. W. Bogart.
L. E. Hoses.

Inventor.
William H. Doane
By Kell Hosea Atty.

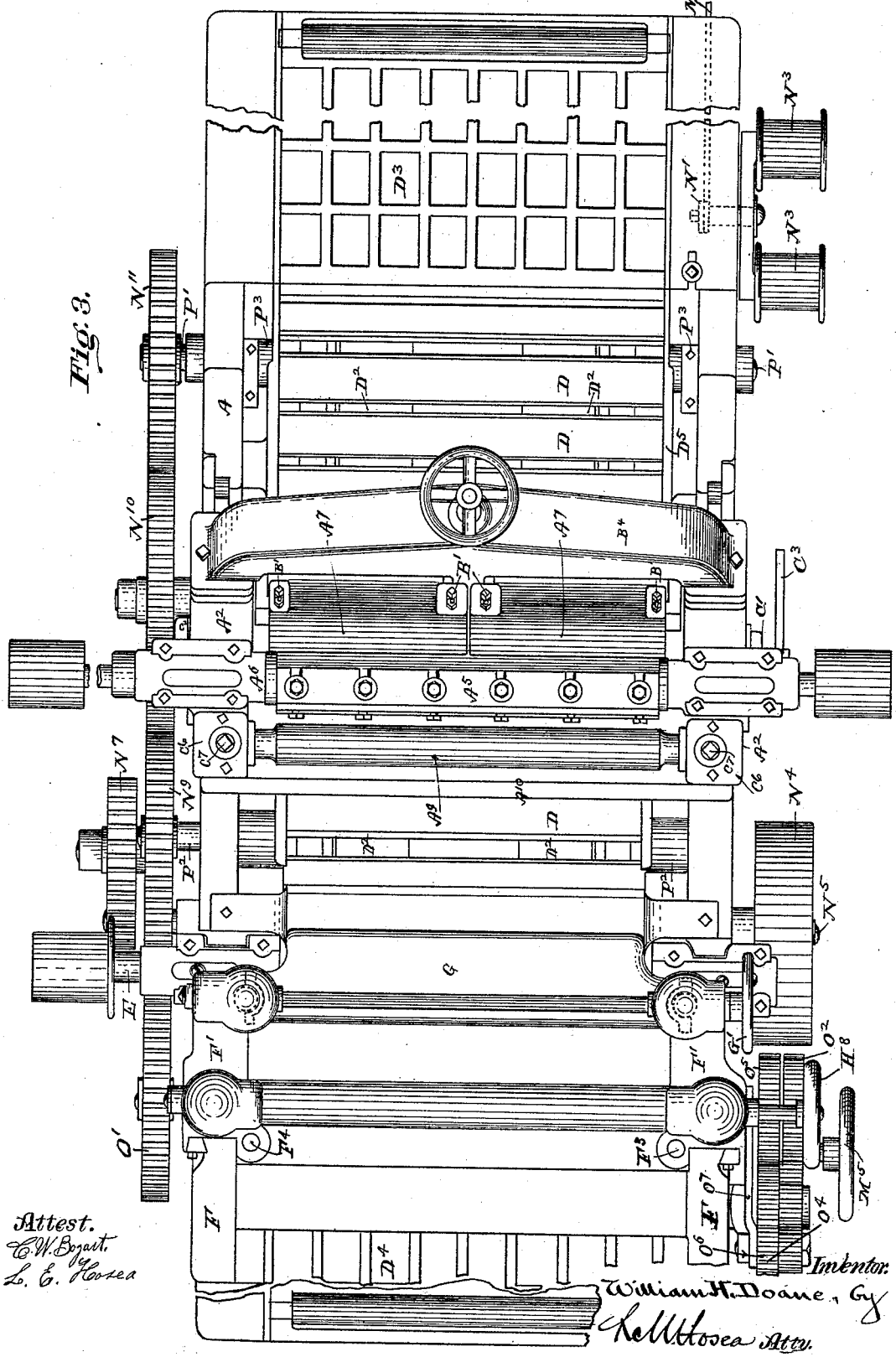

(No Model.) 5 Sheets—Sheet 4.
W. H. DOANE.
ENDLESS BED SURFACE PLANING MACHINE.

No. 417,238. Patented Dec. 17, 1889.

Attest.
E. W. Bogart.
L. E. Hosea.

Inventor.
William H. Doane
By Kell Hosea
Atty.

(No Model.) 5 Sheets—Sheet 5.
W. H. DOANE.
ENDLESS BED SURFACE PLANING MACHINE.
No. 417,238. Patented Dec. 17, 1889.
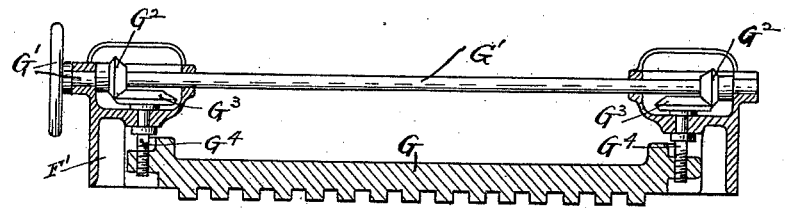
Fig. 5.
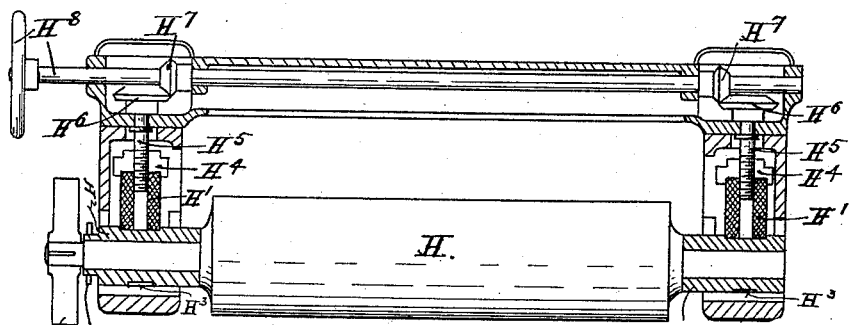
Fig. 6.
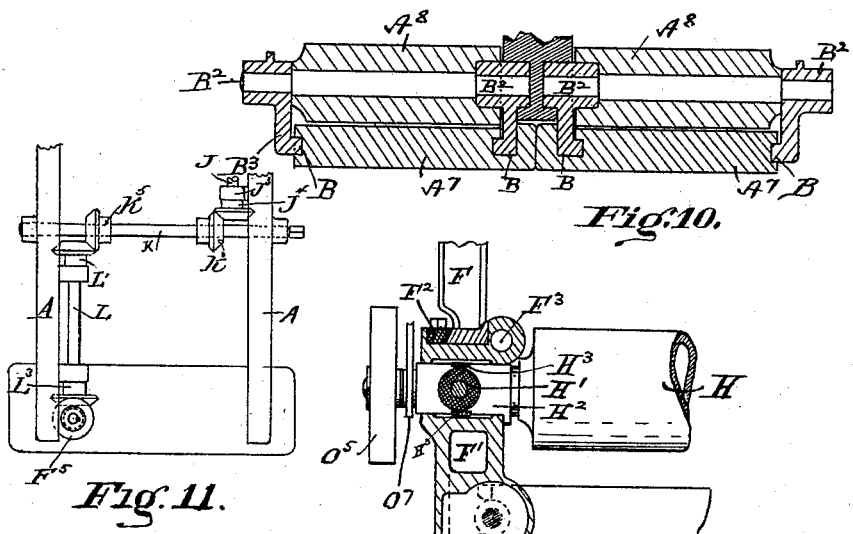
Fig. 10.
Fig. 11.
Fig. 7.
Attest.
C. W. Bogart.
L. C. Hosea.
Inventor
William H. Doane
By R. M. Hosea
Atty.

UNITED STATES PATENT OFFICE.

WILLIAM H. DOANE, OF CINCINNATI, OHIO.

ENDLESS-BED SURFACE-PLANING MACHINE.

SPECIFICATION forming part of Letters Patent No. 417,238, dated December 17, 1889.

Application filed October 22, 1888. Serial No. 288,839. (No model.)

*To all whom it may concern:*

Be it known that I, WILLIAM H. DOANE, a citizen of the United States, residing at Cincinnati, Ohio, have invented new and useful Improvements in Endless-Bed Surface-Planing Machines, of which the following is a specification.

My invention relates to the class of planing-machines known as "endless-bed surface-planing machines;" and it consists, generally, in an improved construction and arrangement of certain of its parts, and in additional features, whereby its capacity and efficiency are increased.

The improvement relates more particularly, first, to the combination, upon and in connection with an adjustable housing-frame, of the upper cutting-cylinder, feeding-in roll, presser-bar, and after-cut presser-roll in such constructive relation as that, while all are adjustable together by the movement of the housing, each possesses an independent capacity of adjustment, as may be required; second, to the construction and arrangement of the propelling mechanism of the endless bed or traveling apron, whereby the propelling power is applied simultaneously to both its driving-sprockets, thereby relieving the apron of all unnecessary strain upon its articulated joints; third, to the combination, with the lower cylinder, of a presser-bar and upper feeding-out roll, both carried upon an adjustable housing, whereby they are adjusted together, and constructively arranged so that each element possesses an individual capacity of adjustments as may be required; fourth, to the general construction of the machine wherein the housing of the upper cylinder, feed-in roll, and presser-bar, and the housing of the lower cylinder presser-bar and feed-out roll are so arranged and connected that both housings may be adjusted together by power or by hand, or may be disconnected and adjusted separately; fifth, to details of construction and arrangement of mechanism whereby the various capacities and functions are efficiently realized and the machine rendered practical, durable, and economical of construction.

The following specification sets these forth in detail and will be readily intelligible in connection with the accompanying drawings, in which the parts hereinafter designated are indicated upon the drawings by the letters of reference.

Figure 2:
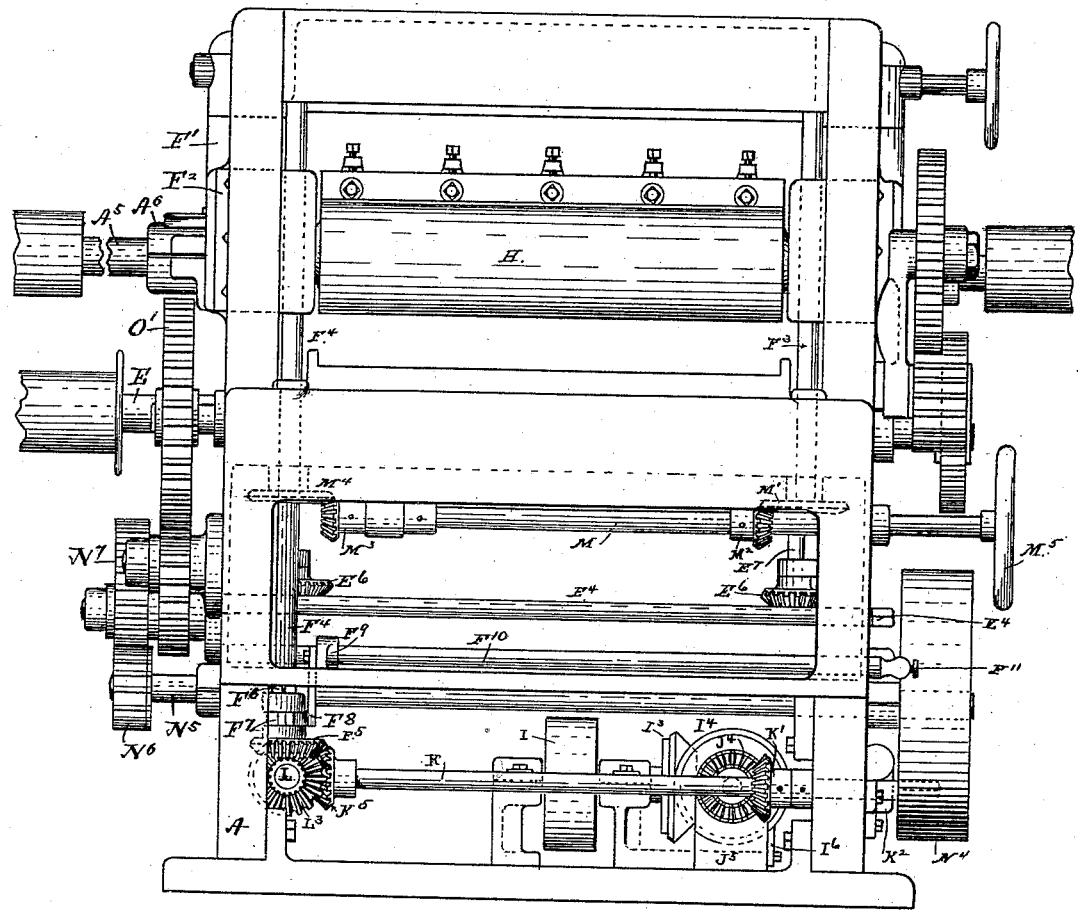
Figure 8:
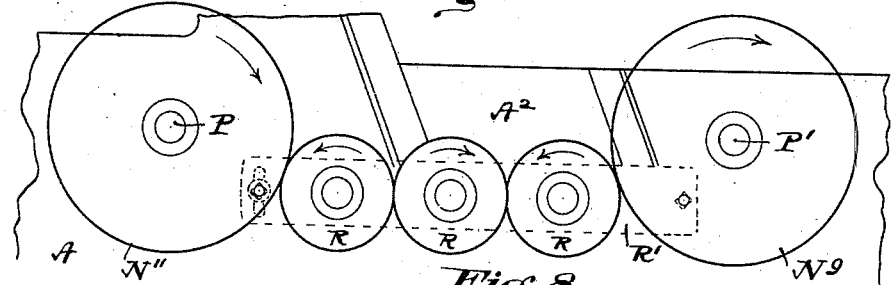
Figure 9:
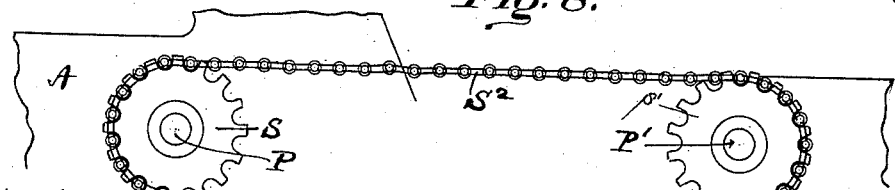
Figure 4:
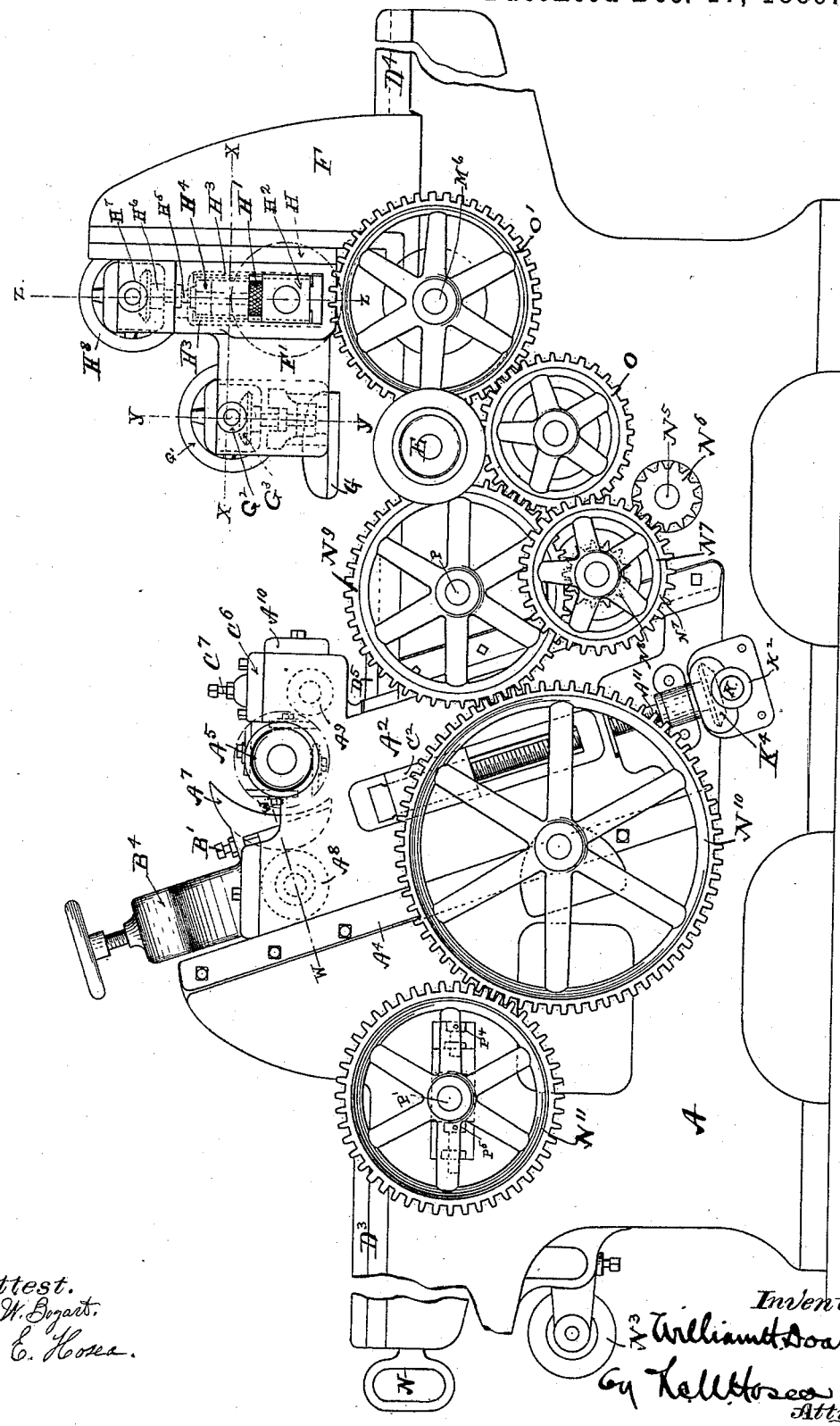

Referring now to the drawings, Figure 1 is a left-side elevation of a planer embodying my improvements; Fig. 2, an end elevation; Fig. 3, a general plan view; Fig. 4, a right-side elevation; Fig. 5, a longitudinal vertical section of the presser-bar over the lower cutter-cylinder, taken in the plane $y\ y$ of Fig. 4; Fig. 6, a longitudinal sectional elevation of the housing construction of the feed-out roller, taken in the plane $z\ z$ of Fig. 4; Fig. 7, a partial horizontal section of the side housing, taken in the plane $x\ x$ of Fig. 4. Figs. 8 and 9 are diagrams indicating constructive modifications in the application of driving-power to the endless bed. Fig. 10 is a longitudinal section of the presser-bar and roller before the cut of the upper cylinder, taken in the plane $w\ w$ of Fig. 4. Fig. 11 is a plan showing the arrangement of shafts J, K, and L with gearing.

The type of machines to which my invention is applied is illustrated and described in Letters Patent of the United States No. 214,062, dated April 8, 1879, and the present invention may be regarded in some degree as an improvement thereon. In general said former patent exhibits a "surface-planer" having upper and lower "cylinders" or cutter-heads for planing the upper and lower surfaces of lumber at one operation, and an "endless bed" or traveling "apron" for carrying the work through the machine. The upper cylinder in this type is housed or carried upon an adjustable frame gibbed upon the supporting-bed of the machine in ways inclined to the vertical and the lumber treated is forced out by the succeeding board, there being no feed-out rolls.

I shall abridge the present description, so far as consistent with clearness by referring only briefly to necessary parts and features as exist in the type of machines referred to, elaborating only in respect to such constructive changes and new features as are embodied in my present improvements.

Referring now to the drawings, A designates the main supporting frame or bed of the machine, A² the housing-frame of the upper cylinder A⁵, (said housing being gibbed to the bed by gibs A³ A⁴,) and A⁶ the upper cylinder-bearings.

A⁷ A⁷ designate the presser-bars, and A⁸ A⁸ the presser-rollers before the cut of the upper cylinder.

A⁹ designates the presser-roller after the cut of the upper cylinder, and A¹⁰ a girt connecting the two sides of the housing-frame A². The presser-bars A⁷ and presser-rollers A⁸ may be regarded as a single roller or bar divided to allow a separate adjustment at each side of the machine for lumber of different thicknesses. The upper cylinder, presser-bars, presser-rolls, and after-cut roll are all carried in and upon the housing-frame A² and partake of its general adjustment, and can be locked in position by rod C, blocks C′ C², and lever C³. Independent adjustments are, however, provided as follows: The presser-bars A⁷ (to which I prefer to give a crescent-formed cross-section, as shown in Figs. 1 and 4) are provided at each end with a groove B, having the same relative inclination to the vertical as the housing-frame A², by means of which groove the presser-bars are fitted to slide upon projecting ribs B³ on the roller-boxes B², forming guideways of the same angle of inclination parallel with the slides of the housing-frame A², and are adjusted to position by set-screws B′, threaded through the upper end wall of the groove B, and held by accompanying jam-nuts.

The presser-bars A⁷ and rollers A⁸ are carried by a housing B⁴, having a sliding connection with the main housing-frame A² at the same angle as the inclined guide-ribs B³, and are held down by springs, as indicated by dotted lines in Fig. 1, allowing a limited upward play for varying thicknesses of lumber, &c.

The detailed construction and arrangement of the housing and springs, so far as the present application is concerned, does not differ from what is shown in a former patent, No. 306,325, dated October 7, 1884, and need not be further described here.

The after-cut roll A⁹ is carried in boxes C⁴, held in vertical slides in the frame or housing, and are held downward by springs C⁵, regulated by set-screws C⁷, passing downward through top caps C⁶ and held by jam-nuts. The pressure is thus regulated, while a certain amount of yielding resiliency is left to the roll to accommodate itself to the lumber. It will thus be seen that while all these parts—the two sets of rolls A⁸ and A⁹, the cutting-cylinder A⁵, and the presser-bar A⁷—are moved in common by the general adjustment of the housing A², yet each element has its independent adjustment, and is thus under independent control of the operator, as required.

The improvements in the traveling bed are as follows: D designates the slats of the traveling bed, constructed and articulated in the usual manner to move upon parallel guideways or slides D², supported upon girts or brackets D′, secured across the frame A between its sides. D³ and D⁴ designate, respectively, the feeding-in platen and the feeding-out platen, and D⁵ the "fence" passing over the bed. P P′ designate the sprocket-shafts, carried in bearings P² P² and P³ P³, the bearings P³ P³ being adjustable horizontally in slots of the main frame A by set-screws P⁴ P⁵. P⁶ P⁷ designate the sprocket-drivers upon the shafts P P′, by which the traveling bed is impelled upon its guides.

In former constructions of endless-bed planing-machines the power is applied to but one of the driving-shafts, thus bringing an undue strain upon the traveling bed. In my improvement I apply power to both drivers. Thus in Fig. 4 the sprocket-shafts are provided with an external spur-gear N⁹ N¹¹, and the power applied to one is communicated to the other through an intermediate idler-gear N¹⁰, carried upon a stud bracketed upon the outside of the frame A.

In Fig. 8 is shown a slightly-modified construction, in which the intermediate single gear N¹⁰ is replaced by a train of three idlers R R R, carried upon studs secured to a bridge-piece R′, reaching across the space of the roller-housing frame A². Such bridge-piece is pivoted at the end adjacent to the fixed sprocket-shaft of the endless bed, and is arranged to have a vertical adjustment at the other to accommodate the horizontal adjustment of the opposite sprocket-shaft.

In Fig. 9 the gears N⁹ N¹¹ are replaced by sprocket-wheels S S′ and the intermediate idler or idlers by a chain S², connecting the two.

In the first construction the supporting-bracket carrying the intermediate idler-gear is adjustable upon the frame, in order that as the bearings P³ are moved back to take up any wear of the links of the traveling bed the gear may be also moved up to preserve the proper mesh. The various constructions, however, are but varying mechanical means of accomplishing the same end—to wit, a simultaneous and equal application of power to both carrying-sprockets of the traveling bed. Where the power is applied only to the sprocket-wheels at one end, the movement is irregular, besides causing wear and cutting of parts. By this improvement, however, I obtain a more perfect, positive, and uniform movement of the bed with less strain of the parts, less wear, less liability to cut, and altogether a stronger and more positive feed of the bed.

The improvement relating to the lower cylinder and feeding-out rolls is as follows: F F designate stands at each side of the machine, and F′ a bracket gibbed by gibs F² to the stands F, so as to have a vertical adjustment thereon, as determined by vertical screw-shafts F³ F⁴, carried in bearing projections of the stands F and threaded through projections of the bracket F', as a means of moving the same vertically on its guides when actuated, as described later. The bracket F' carries horizontally between extensions of its front face a presser-bar G, whose ends have a sliding fit in vertically-planed grooves in the corresponding inner faces of said extensions to move as impelled by adjusting-screw G⁴, operated by the ordinary hand-wheel, and rod G' and pinion and gear connection G² and G³ to accommodate slight variations in the cutting-edge of the upper cylinder as affecting the surface of the work under treatment. The roller H is adjustable to regulate the pressure on the lumber when feeding out. To this end its roll-boxes H² are carried in vertical guide-slots in the sides of the bracket F' and adjustable downward by screws H⁵, operated by bevel-gears H⁶ H⁷ and hand-wheel H⁸ and shaft. The roll-boxes H² are carried in yokes composed of nut or bridge H⁴ and side stirrups H³ H³, with a rubber block or spring H' interposed above the roll-box, the whole being adjusted downward by the set-screws, but allowing a slight automatic adjustment upward against the resiliency of the spring to accommodate chance irregularities in the thickness of lumber. The construction is clearly shown in Figs. 4, 6, and 7. It will thus be seen that, while the general adjustment of the bracket F vertically carries both the roller H and the presser-bar G simultaneously, yet the roller and presser-bar each has its independent adjustment by hand, and the roller has an automatic yielding adjustment to accommodate irregularities in planing, or when bits of the top cylinder have so worn as to leave the lumber a little thicker when it reaches the bar.

The constructive arrangement for adjusting the bracket-housing F' upon its stands F is as follows: The screw-shafts F³ F⁴, threaded, as described, in projections of the bracket shown at F³, Fig. 7, carry bevel-pinions M' M⁴, Fig. 2, which are engaged by similar pinions M² M³ upon a cross-shaft M, journaled in the bed-frame A and operated by an external hand-wheel M⁵ for hand adjustment. The screw-shaft F⁴ is at one side extended downward, Fig. 2, to near the base of the machine, and carries a second bevel-pinion F⁵, having a slot-and-feather attachment to the shaft, allowing it to be moved up or down, while maintaining a rotary connection. It is adjusted up or down by a collar F⁷, suspended by links F⁸ from a crank F⁹, carried upon a cross-shaft F¹⁰, journaled in the frame A and provided externally with a hand-lever F¹¹. The object of this construction is to bring the screw-shaft F⁴ into or out of connection at will with a shaft L, journaled horizontally below in the frame. The shaft carries a fixed bevel-pinion L³, into or out of mesh with which the pinion F⁵ is moved by rotating the shaft F¹⁰ by its hand-lever F¹¹. The shaft L extends to a mid-point longitudinally in the frame A, and is geared by bevel-pinions L' K⁵ to a cross-shaft K, journaled in bearings K² and extending through the frame A, and actuated when hand adjustment is desired by a square-socketed hand-lever applied to the squared projecting end of the shaft. The shaft K at a point within the frame A carries a second bevel-pinion K', gearing with a similar pinion J⁴ on a shaft J, extending longitudinally with the main frame A in bearings J³ J² to near its remote end, where it is terminated by a bevel friction double gear I⁴. The cross-shaft K also carries two bevel-gears K³, meshing with similar gears K⁴ at the lower ends of the housing screw-shafts A¹¹. The double friction-gear I⁴ is carried by a slot-and-feather engagement on shaft J, and carries a central shifting yoke I⁵, to which is attached a shifter-lever I⁶, whose lower end is pivoted to the bearing-frame J⁵, attached to the main frame A. By means of this lever the gear I⁴ is shifted to bring one or the other of its faces alternately into engagement with a bevel friction-gear I³ on the main driving-shaft I', which receives power by its belt-pulley I.

It may now be explained that the power of the driving-shaft I' is controlled as to direction by the hand-lever I⁶ by bringing one or the other face of the gear I⁴ into engagement with the friction-gear I³, is transmitted by the shaft J and bevel-pinions J⁴, first, to the cross "raising" shaft K, and through gears K³ and K⁴ to the raising-screws A¹¹ of the housing A², carrying the upper cylinder, its presser-bar and rolls; second, the power is at the same time transmitted onward by the shaft L through the gears K⁵ L' L³ and the gear F⁵ (the latter being for this purpose depressed into mesh with L³ by the hand-lever F¹¹ and connections described) to the screw-shaft F⁴, and thence through the cross-shaft M and gears to the screw-shaft F³, thus adjusting the bracket-housing F' (carrying the presser-bar of the lower cylinder and the upper feed-out roll) simultaneously with the housing-frame A². It will thus be seen that this simultaneous adjustment may be made by power or by hand—in the latter case by the hand-lever applied, as described, to the projecting end of the shaft K. The advantage of the construction is that, without sacrificing any function or capacity for individual adjustment of the various parts, the described connections enable the operator to raise or lower the upper cylinder and its adjuncts—the presser-roll and presser-bar—and by the same movement simultaneously adjust the presser-bar of the lower cylinder and the upper feed-out roll to correspond. This, as will be obvious, conduces to great saving of labor and time in adjusting the action of the machine to different thicknesses of lumber. The lower cylinder E is carried in sliding boxes in the frame and adjusted by a wrench or square-socketed lever applied to the projecting end of a shaft $E^4$, journaled in the frame A and carrying bevel-gears $E^5$, engaging similar gears $E^6$ upon the adjusting-screws $E^7$. This is of course wholly independent of the other adjustments referred to.

The parts concerned in the transmission of power to the rolls and cylinders are as follows: A feed-shaft $N^5$ receives power through a belt-pulley $N^4$ at one projecting end and transmits it at the opposite projecting end by a spur-gear $N^6$ to the traveling bed through the gears $N^7$ $N^8$ and the train of gears $N^9$ $N^{10}$ $N^{11}$, already described. The gear $N^9$ gives motion through an intermediate gear O to a gear O' upon the shaft $M^6$ of the lower feed-out roll. The opposite end of said roll-shaft carries a gear $O^2$, by which motion is transmitted to the upper roll H by a train of expansion-gears $O^3$ $O^4$ $O^5$ $O^4$, being carried upon an expansion-yoke $O^6$, pivoted in the stand F, and held by an expansion-link $O^7$ to the roll-box $H^2$. The upper and lower feed-out rolls are thus driven in unison irrespective of the adjustment of the upper roll H. The cylinders are driven by belt-connections in the usual manner.

I claim as my invention and desire to secure by Letters Patent of the United States—

1. In a surface-planer of the character described having a power-driven feed-bed, the combination of a housing-frame carried in guides at the sides of the bed-frame, extending above and below the feed-bed, and inclined to an acute angle with the feed-in side of the bed, an upper cutting-cylinder, a presser-bar and presser-roll before the cylinder, and a presser-roll after the cylinder, said cylinder, presser-bar, and rolls being carried between the sides of the housing and between or approximately between the cross-planes of the guides, substantially as set forth.

2. In an endless-bed surface-planer, in combination with a lower cylinder and lower power-driven feed-out roll, an upper power-driven feed-out roll and a presser-bar, both carried upon a vertically-adjustable housing, substantially as set forth.

3. In an endless-bed surface-planer, in combination with a lower cylinder and lower power-driven feed-out roll, an upper power-driven feed-out roll and presser-bar, both carried upon a vertically-adjustable housing and adjustable simultaneously therewith and independently adjustable upon said housing, substantially as set forth.

4. In an endless-bed surface-planer, the combination of an upper and an under cutting-cylinder, two vertically-adjustable frames, one carrying the upper cutting-cylinder feed-in rolls and a presser-bar above the feed-bed, and the other carrying an upper feed-out roll and a presser-bar above the under cutting-cylinder and lower feed-out roll, and power-driven connecting mechanism whereby both adjustable frames may be elevated or depressed in unison, substantially as specified.

5. In a surface-planer of the character described, the combination of an endless feed-in bed, an upper cutting-cylinder and connected presser-bar adjustable together, a lower cutting-cylinder, a lower feed-out roll, an upper feed-out roll and connected presser-bar adjustable together, and detachable connecting mechanism between said upper feed-out roll and its connected presser-bar and said upper cylinder and its connected presser-bar for the simultaneous or independent adjustment of said upper cylinder and upper feed-out rolls and their connected presser-bar, substantially as specified.

6. In a surface-planer of the character described, the combination of an endless feed-in bed, an upper cutting-cylinder and connected presser-bar adjustable together, a lower cutting-cylinder, a lower feed-out roll, an upper feed-out roll and connected presser-bar adjustable together, connecting mechanism between said upper feed-out roll and its connected presser-bar and said upper cylinder and its connected presser-bar, and connections between said mechanism and the general driving mechanism of the machine, whereby the adjustment of said upper cylinder and upper feed-out roll and their connected presser-bars may be effected in unison by the driving-power, substantially as specified.

7. In an endless-bed planing-machine, the combination of the traveling bed, sprocket-carrying wheels arranged in the bights of the endless bed and carrier, one in fixed and the other in adjustable bearings, to take up slack or lost motion, and outside driving-connections applied to both sprocket-wheels and adjustable to the varying distances between the same, whereby the power applied to one is at all times communicated equally to the other to relieve strains upon the bed, substantially as set forth.

8. In a planing-machine of the character described, in combination with the lower cylinder and feed-out roll, a bracket or cross-head movable and guided upon vertical stands and carrying the presser-bar and upper feed-roll, a cross-shaft geared to and connecting said screw-shafts and provided with hand actuating mechanism, and power-connections to one of said screw-shafts, whereby they may be actuated in unison either by power or by hand, as required, substantially as set forth.

9. In a surface-planing machine, an upper cylinder mounted in a housing-frame adjustable at an angle with the vertical, a power-driven feeding-out roll arranged in bearings having a vertical adjustment, and adjusting mechanism whereby the same may be adjusted independently or connected and adjusted simultaneously, substantially as set forth.

10. In a surface-planing machine, the combination of an upper cylinder mounted in a housing-frame adjustable at an angle with the vertical, a power-driven feeding-out roll arranged in bearings having a vertical adjustment, and adjusting mechanism whereby the same may be adjusted independently or connected and adjusted simultaneously, substantially as set forth.

In testimony whereof I have hereunto set my hand in the presence of two subscribing witnesses.

WILLIAM H. DOANE.

Witnesses:
L. M. HOSEA,
L. E. HOSEA.